Feb. 26, 1935.  E. G. PETERSEN  1,992,765
THERMOSTATIC SWITCH
Filed Feb. 4, 1931  3 Sheets-Sheet 1
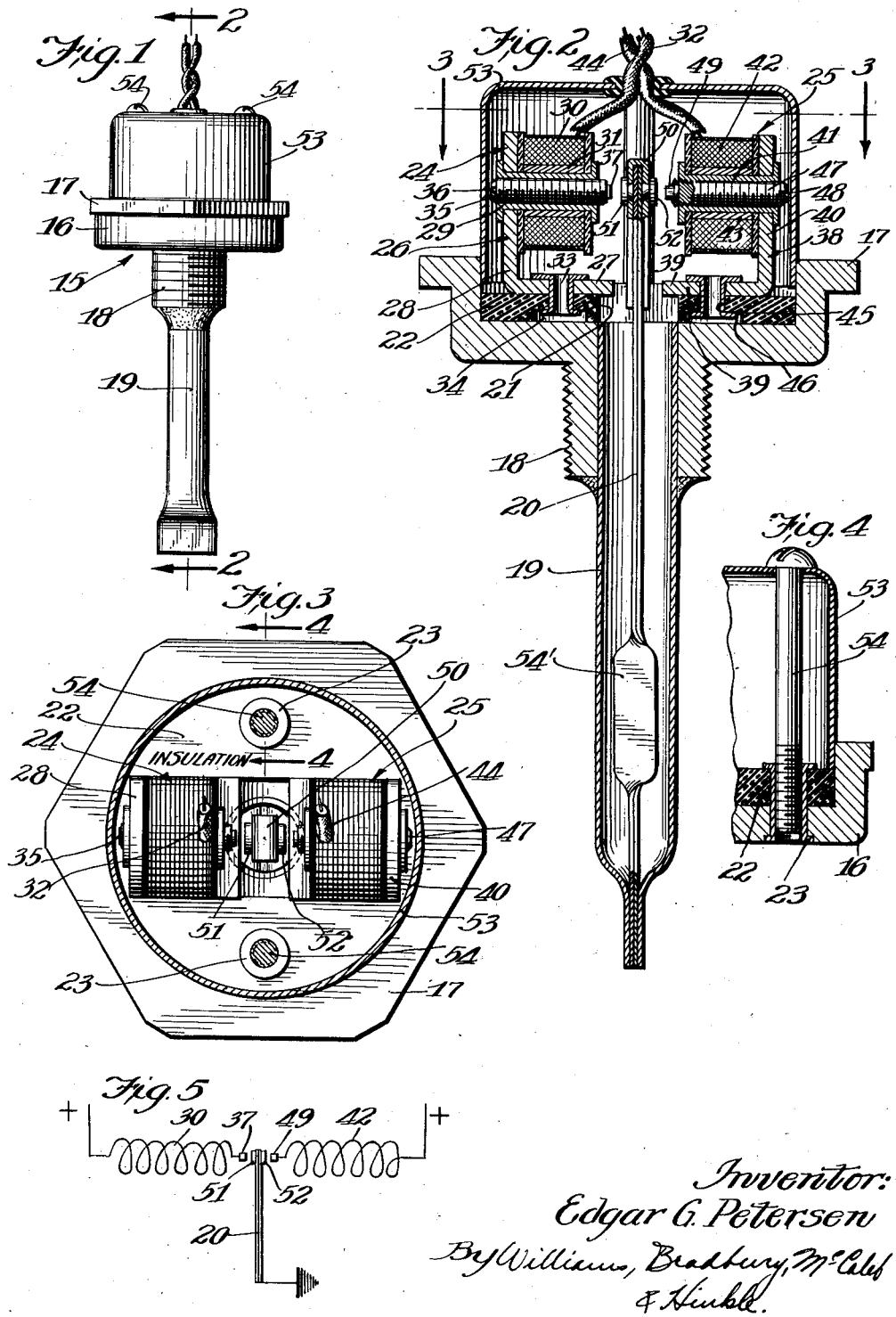
Inventor:
Edgar G. Petersen
By Williams, Bradbury, McCaleb
& Hinkle
Attys.

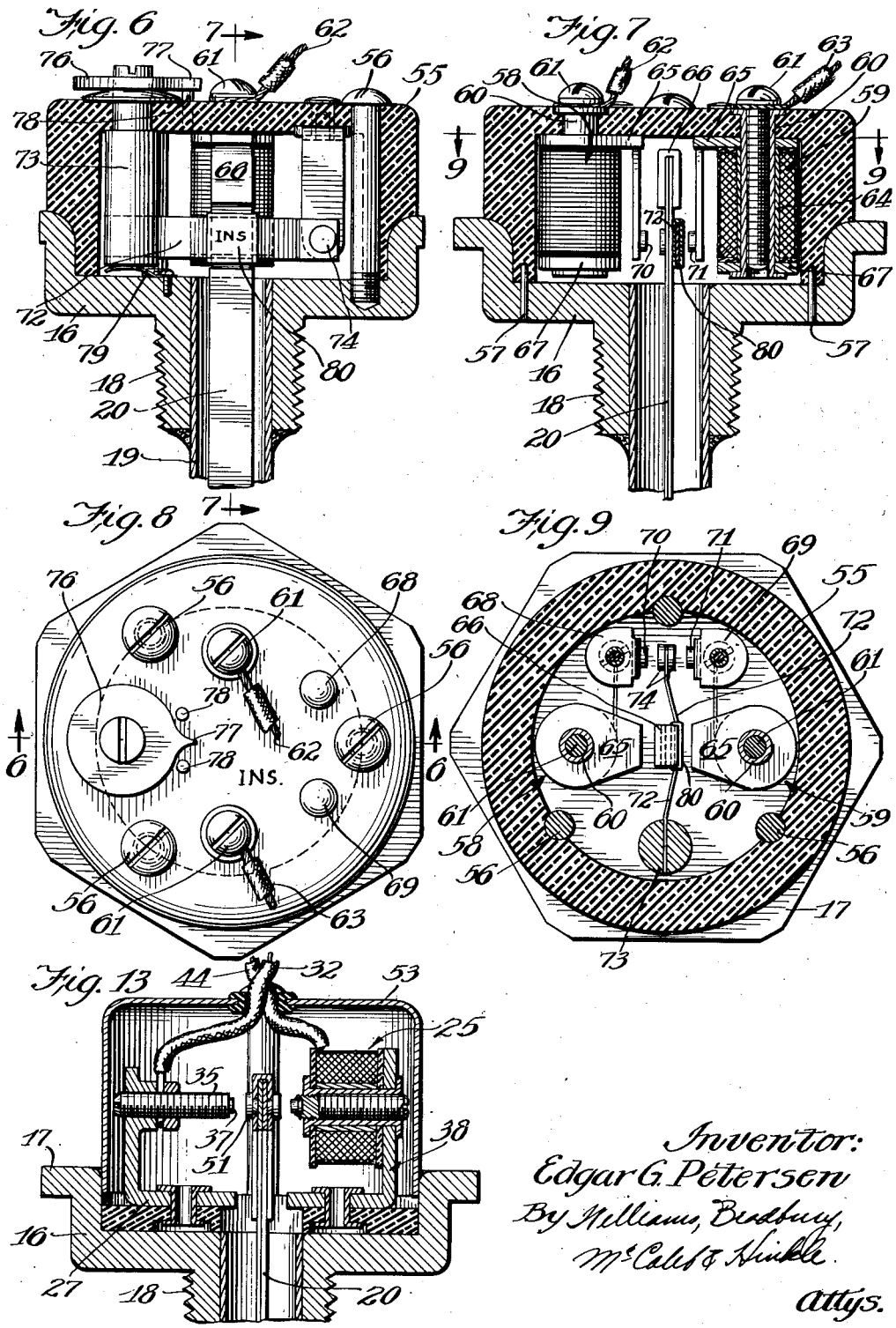

Feb. 26, 1935.  E. G. PETERSEN  1,992,765
THERMOSTATIC SWITCH
Filed Feb. 4, 1931  3 Sheets-Sheet 3
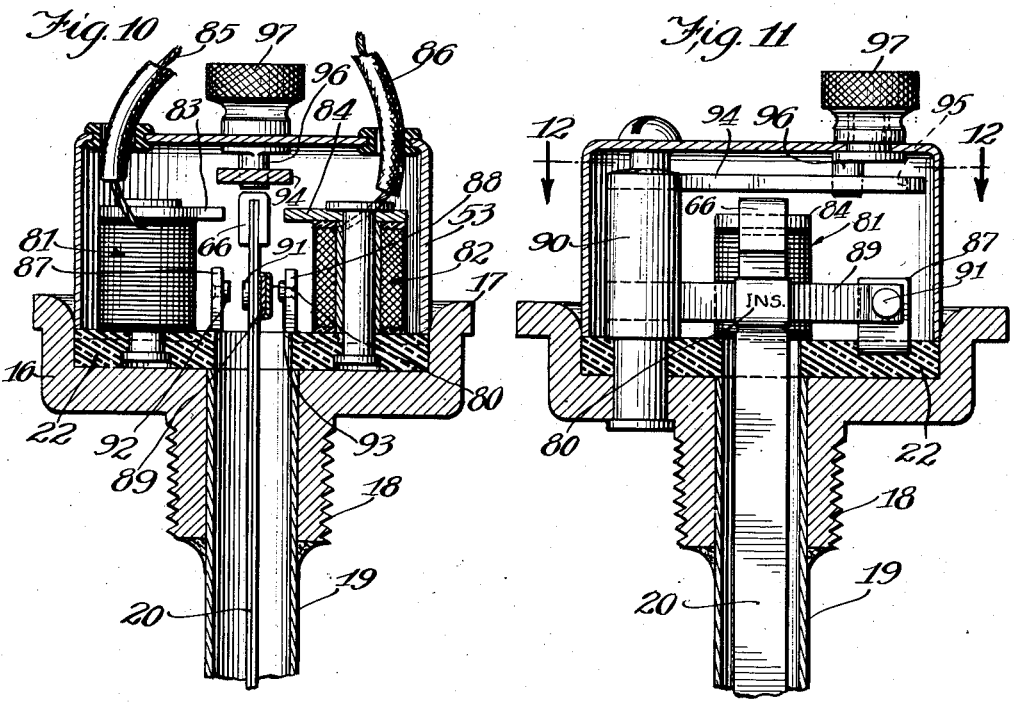
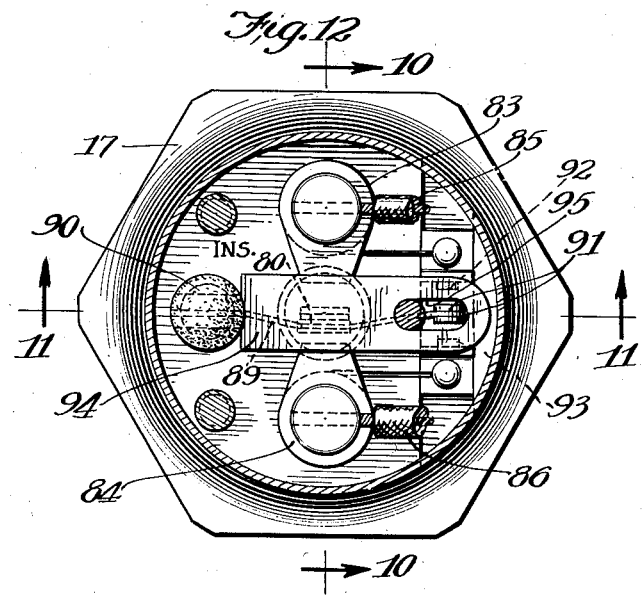
Inventor:
Edgar G. Petersen
By Williams, Bradbury, McCabe
& Hinkle, Attys.

Patented Feb. 26, 1935

1,992,765

UNITED STATES PATENT OFFICE 1,992,765

THERMOSTATIC SWITCH

Edgar G. Petersen, Chicago, Ill., assignor to Pines Winterfront Company, Chicago, Ill., a corporation of Delaware Application February 4, 1931, Serial No. 513,277

11 Claims. (Cl. 200—138)

This invention relates to thermostatic switches and particularly to switches which are adapted to control one or more electrical circuits.

One of the objects of the invention is to provide an improved thermostatic switch including means for ensuring firm contact between the circuit making contact members and for preventing vibration of the contacts and consequent arcing.

A further object of the invention is to provide a simple thermostatic switch which is adapted to be readily mounted in the water cooling system of an internal combustion engine, the temperature of which is to be controlled.

A further object of the invention is to provide a thermostatic switch which shall be economical and simple to construct and which may be readily adjusted to provide accurate control within a desired temperature range.

A further object of the invention is to provide a thermostatic switch having an improved means for rough adjustment as well as means for providing fine adjustment.

Another object is the provision of an improved thermostatic switch in which the contacts are positively held together when the switch is on closed circuit but in which no load or bending stress is exerted on the thermostat other than that induced by heating effects.

Another object is the provision of an improved thermostatic switch which is adapted to automatically maintain the contacts in clean and bright condition, thereby reducing contact resistance and ensuring uniform action.

Another object of the invention is to provide an improved thermostatic switch in which the thermostatic element is adapted to move towards a contact and transverse thereto under the influence of changing temperature.

Another object of the invention is to provide a thermostatic switch in which firm contact is maintained by magnetic means in one extreme position and by heat produced in the heat responsive element in the other extreme position.

Further objects and advantages of the invention will appear from the following description of preferred embodiments thereof, taken in conjunction with the accompanying drawings, in which Figure 1 is an elevational view of a thermostatic switch embodying the invention.

Fig. 2 is a sectional view through same on the line 2—2 of Fig. 1,

Fig. 3 is a sectional plan view taken on the line 3—3 of Fig. 2.

Fig. 4 is a sectional detail view on the line 4—4 of Fig. 3,

Fig. 5 is a wiring diagram,

Fig. 6 is a sectional view of a modified embodiment of the invention, partly broken away, taken on the line 6—6 of Fig. 8, Fig. 7 is a similar view taken on the line 7—7 of Fig. 8, Fig. 8 is a plan view thereof, Fig. 9 is a sectional plan view taken on the line 9—9 of Fig. 7, Fig. 10 is a sectional view of a modified embodiment of the invention, partly broken away, taken on the line 10—10 of Fig. 12, Fig. 11 is a similar view taken on the line 11—11 of Fig. 12, Fig. 12 is a sectional plan view taken on the line 12—12 of Fig. 11, and Fig. 13 is a sectional detail view illustrating a further modification of the invention.

Referring to Figs. 1 to 5 inclusive of the drawings, the switch designated generally by the reference numeral 15, comprises a base 16 which is preferably dished and carries a flange 17 adapted to be engaged by a wrench or other tool. The base 16 has a central boss 18 which is externally threaded to enable the switch to be conveniently mounted upon the equipment whose changes in temperature are intended to actuate the switch. A tube 19, which is intended to extend into said equipment, is mounted in the boss, and is rigidly secured thereto, for example by welding, soldering or the like.

The tube 19 contains a bimetallic strip 20, and its inner end is flattened to engage the inner end of the bimetallic strip. The end of the tube 19 thus closed is sealed by dipping in solder or in other suitable manner. The strip 20 may be composed of any suitable metals. A strip of invar and brass is highly suitable for use with an automotive cooling system.

The free end of the strip 20 projects through a central opening 21 in a sheet 22 of insulating material, such as bakelite, which sheet is located in the base 16, and is secured thereto by tubular rivets 23. Electromagnets 24 and 25 are mounted on the sheet 22 on opposite sides of the free end of the strip 20.

The electromagnet 24 comprises an iron bracket 26, preferably in the form of an angle and having a leg 27 resting on the sheet 22 and terminating adjacent the edge of the opening 21 therein. The upstanding leg 28 of the bracket 26 carries rigidly a tubular internally threaded iron core 29 on which the winding 30 is mounted.

The winding is mounted on a spool comprising an inner sleeve 31 which is preferably of steel or iron, in order to supplement the core and the inner end of the winding is electrically connected to the sleeve 31, the outer end of the winding being connected to the lead 32 which forms part of an exterior circuit. The bracket 26 is rigidly mounted on the sheet 22 by means of rivets 33, which are maintained out of contact with the base 16, for example, by means of recesses 34 provided in the sheet 22. An iron screw 35 is mounted in the hollow core 29 and is adapted to be adjustably positioned therein by means of a slot 36 in its outer end. As will readily be understood from Fig. 2, the ends of the tubular core member 29 are spun over or deformed so as to maintain the spool assembled and securely mounted upon the bracket 26.

The inner end of the screw 35 carries a contact 37 which is preferably of non-corrodible metal or alloy. Any suitable contact material resistant to oxidation and destruction by arcing may be employed, such as copper, silver, iridium, platinum, or the like.

The electromagnet 25 is similar to the electromagnet 24, and comprises an iron bracket 38 having a leg 39 secured to the sheet 22 by means of rivets 45, and an upstanding leg 40 carrying the hollow internally threaded iron core 41 on which the winding 42 is mounted. The inner end of the winding 42 is electrically connected to the sleeve 43, its outer end being connected to the lead 44 which forms part of an exterior circuit. The sheet 22 is provided with recesses 46 to maintain the rivets 45 out of contact with the base 16. An iron screw 47 carrying a contact 49 at its inner end is mounted in the hollow core 41 and is adjustable therein by means of a slot 48 in its outer end.

The free end of the bimetallic strip 20 has secured thereto an iron shoe 50 which extends over both faces and carries contacts 51 and 52 which are adapted to engage the contacts 37 and 49 respectively.

The electromagnets 24 and 25 and associated parts are preferably enclosed by a cover 53 which may suitably be secured in position by screws 54 which enter the tubular rivets 23, which may be internally threaded to receive them. The cover 53 is provided with a suitable opening for the leads 32 and 44 to pass through.

As will readily be understood from the drawings, the bimetallic strip 20 is arranged to bend with change of temperature to cause its free end to move towards one of the electromagnets 24 and 25. A small portion 54' of the strip is bent into right angles to the remainder of the strip so that bending is accompanied by a slight transverse movement which provides a scraping contact between the contacts 51 and 52 and the contacts 37 and 49 respectively, which tends to keep the contacts clean and ensures good electrical connections therebetween. The repeated wiping contacts made in normal operation has the effect of polishing the contacts 51, 52, 37 and 49, and maintaining same in good working condition.

The switch is adapted to close the exterior circuit through the lead 32 at a certain temperature and to close the exterior circuit through the lead 44 at a certain other temperature. In this embodiment of the invention these circuits are grounded through the strip 20, tube 19 and boss 18. Coarse adjustment of the strip 20 with respect to the contacts 51 and 52 may be obtained by bending the tube slightly. Fine adjustment may be attained by manipulating the screws 35 and 47.

Assuming that the left hand strip of the bimetallic strip 20, as viewed in Fig. 2, to be the strip of lesser thermal expansion, for example invar, and the right hand strip to be of greater thermal expansion, for example brass, then when the temperature of the bimetallic strip falls below a predetermined point, the contact point 52 will make contact with the point 49 and complete a grounded circuit through lead 44, winding 42 and strip 20. This current magnetizes the core and the angle iron 38, and the shoe 50 is thereby attracted so that the points 52 and 49 remain in firm contact while the current is passing. It will be understood that the current is adapted to actuate devices which tend to raise the temperature. For example, it may be used to drive a motor to close the shutters of an automotive vehicle radiator shutter, the boss 18 being threaded into an opening in the cooling system so that the tube 19 is immersed in the cooling medium. Means, such as limit switches, may be provided in the exterior portion of the circuit for interrupting same when the actuating devices have been moved to the desired extent, and the strip 20 is thereupon released so that it may move in accordance with the temperature in the cooling system.

When the temperature of the cooling system rises to a point predetermined by the adjustment of the device, the strip 20 is bent into a position in which the contact points 51 and 37 make contact. This contact completes a grounded circuit through the lead 22, winding 30 and strip 20. The core and angle iron 26 become magnetized, attract the shoe 50 and maintain a firm contact between the points 37 and 51 until the circuit is broken. This circuit may be employed to actuate the same or another motor to open the shutters and the circuit may be broken by a limit switch associated therewith, when the operation effected by the motor is complete.

It will be understood that the electromagnets are unenergized and exert no attraction upon the bimetallic strip until the points make contact, the time at which contact is made being determined solely by the movement of the bimetallic strip under the influence of change of temperature. When, however, contact occurs the electromagnet is energized and the contact is made firm and maintained until the outer circuit is broken. The break between the contacts is without sparking or arcing since the circuit is interrupted exteriorly. It will readily be understood that the bimetallic strip is subjected to no other load or strain than that imposed by change of temperature, so that it remains accurate and frequent adjustments are unnecessary.

In the modification illustrated in Figs. 6 to 9 inclusive the construction of the base 16, tube 19 and bimetallic strip 20 is substantially the same as described above. The remainder of the switch mechanism is carried by a cover 55 which is preferably of insulating material, such as bakelite, and is secured upon the base by means of screws 56, the cover being accurately located with respect to the bimetallic strip by means of guide-posts 57 which enter appropriate openings in the flange of the cover 55.

The electromagnets 58 and 59 are supported from the cover 55 by means of tubular members 60 which form part of the cores of the magnets.

The tubular members 60 are internally threaded to receive the iron screws 61 which serve to connect the leads 62 and 63 to the cores of the magnets 58 and 59 respectively. The magnets comprise steel sleeves 64 to which the inner ends of the windings are connected. The cores comprise upper pole plates 65 which project outwardly towards a shoe 66 carried on the upper end of the bimetallic strip 20. When contact is made, in the manner hereinafter described, the shoe 66 will find itself in a strong magnetic field between the upper pole plates 65 and lower pole plates 67, and will be strongly attracted in the direction in which it has moved to make contact.

The outer ends of the windings of the electromagnets 58 and 59 are connected to posts 68 and 69 respectively. The posts 68 and 69 are mounted upon the cover 55 and carry depending portions which are provided with contact points 70 and 71 respectively. A resilient contact arm 72, rigidly carried by a post 73, extends transversely so that its free end lies between the contacts 70 and 71. The arm 72 carries contact points 74 which are adapted to engage the contact points 70 and 71. The arm 72 is bent as shown in Fig. 9 so that it may engage one side of the bimetallic strip, so that the contact points 74 will be located intermediate the contact points 70 and 71 when the shoe 66 is intermediate the electromagnets 58 and 59. In order to prevent current from flowing through the bimetallic strip, which might in some cases produce sufficient heat to interfere with the best operation of the switch, I may provide insulation 80 between the arm 72 and the bimetallic strip.

The arm 72 is under tension so that it tends to make contact with the contact point 70, except when prevented by the bimetallic strip 20. In order to adjust this tension the post 73 is mounted upon the cover 55 with stiff frictional fit. Above the cover 55 a button 76 is rigidly mounted on the post 73, said button being provided with a projection 77, located between stops 78 so as to limit the adjustment. A spring 79 mounted on the base 16 makes contact with the post 73 and serves as a ground connection for the circuits through the leads 62 and 63.

In operation, assuming the left hand strip of the bimetallic strip 20, as viewed in Fig. 7, to be the metal of lesser expansibility, and the right hand strip to be the metal of greater expansibility, then if the temperature of the strip falls below a predetermined point, which is determined by the adjustment of the parts, the strip bends towards the electromagnet 59 moving the arm 72 so as to bring one of the contact points 74 into contact with the contact point 71. This completes the circuit through lead 63, the winding of the magnet 59, post 69, arm 72, post 73, spring 79 and ground. The energizing of the electromagnet 59 attracts the shoe 66 and flexes the arm 72 so that the contact between the points 74 and 71 is maintained firm until the circuit is broken exteriorly.

When the circuit is thus broken, the strip 20 is free to respond to the temperature to which it is exposed. When this temperature exceeds a certain point, predetermined by the adjustment of parts, the free end of the strip 20 will have moved to the left as viewed in Figs. 7 and 9 so that the adjacent point 74 makes contact with the point 70, completing the circuit between the leads 62 and ground and energizing the magnet 58. When this occurs, the magnet attracts the shoe 66 towards the left and maintains the strip 20 out of contact with the arm 72 until the circuit is broken exteriorly. It will be understood that the resilience of the arm 72 is sufficient to cause the contact between the points 70 and 74 to be firm and arcless. It will be understood that in this modification a rough adjustment of the strip 20 with respect to the electromagnets can be obtained by bending the tube 19 and that a fine adjustment can be obtained by rotating the button 76 within the limits permitted by the stops 78.

In the modification shown in Figs. 10 to 12 inclusive the electromagnets 81 and 82 are rigidly mounted upon a sheet or disc 22 of insulating material and are provided with upper pole pieces 83 and 84 respectively which are adapted to attract the shoe 66 carried at the upper end of the strip 20. The leads 85 and 86 are connected to the windings of the magnets 81 and 82 respectively, which windings are insulated from the cores of the magnets. The other ends of the windings of the magnets 81 and 82 are connected to posts 87 and 88 respectively, mounted upon the sheet 22 on either side of the free end of a contact arm 89 which extends transversely across the disc 22, one end thereof being rigidly carried by a post 90 which is stiffly mounted upon the disc 22 and base 16. The arm 89 carries contact points 91 which are adapted to engage points 92 and 93 carried by the posts 87 and 88 respectively. The arm 89 contacts with one side of the bimetallic strip 20 and is tensioned so that it tends to bring the adjacent point 91 into contact with the point 92, except when prevented by the strip 20. In order to prevent current from flowing through the bimetallic strip, which might, in some cases, produce sufficient heat to interfere with the efficiency of the switch, I may provide insulation 80 between the arm 89 and the strip 20.

At the upper end of the post 90 is rigidly mounted a transverse bar 94 which is provided at its free end with a slot 95. A stud 96, eccentrically mounted upon a thumb nut 97, rotatably carried by the cover 53, enters the slot 95 so that when the nut 97 is rotated the bar 94 is moved in one direction or the other by the engagement between the stud 96 and the sides of the slot 95. It will be understood that a rough adjustment of the switch can be effected by bending the tube 19 and that fine adjustment may be obtained by rotating the thumb nut 97 which affects the tension of the bar 89 and can be used to modify slightly the position of the strip 20 at a particular temperature.

The operation of this modification is substantially similar to that of the modification shown in Figs. 6 to 9 inclusive, the circuits being, however, grounded in this case. The circuit through the lead 85 passes through the winding of the magnet 81, post 87, contact arm 89, post 90, which is grounded to the base 16. The circuit through the lead 86 passes through the winding of the magnet 82, contact post 88, and arm 89.

The modification shown in Fig. 13 is substantially similar to that shown in Figs. 1 to 5, with the exception that the winding 30 and associated parts are omitted, the pin 35 carrying the contact 37 being mounted on the bracket 27 and the lead 32 is connected directly thereto. In this modification low temperature causes the strip 20 to cooperate with the electromagnet 25. High temperature causes the strip 20 to flex, and causes the contact 51 to touch the contact 37 and permit current to flow through the lead 32 and strip 20 to ground. This current increases the temperature of the strip 20 with the result that it presses the contact 51 firmly upon the contact 37 and prevents arcing and other objectionable effects.

It will readily be understood that this expedient of omitting the electromagnet on the hot side and relying upon the heat generated in the bimetallic strip to prevent arcing may readily be employed in the other embodiments of the invention described above.

Although the invention has been disclosed in connection with the specific details of preferred embodiments thereof, it must be understood that such details are not intended to be limitative of the invention except insofar as they are set forth in the accompanying claims.

Having thus described my invention, what I claim as new and desire to secure by Letters Patent of the United States is:

1. A thermostatic switch comprising a base having means for mounting in desired location, a tube carried thereby, a bimetallic strip therein, an insulating cover for the base readily removable therefrom, contact means supported on the cover adapted to be controlled by said strip to make a circuit, an electromagnet supported on the cover and in said circuit adapted to attract the strip when contact is made.

2. In a thermostatic switch, in combination, a pair of stationary contacts, a resilient arm normally tending to move towards one contact to close a circuit, a thermostatic element separate from said arm and movable under the influence of changing temperature and adapted to move the arm into contact with the other contact point to close another circuit, and electromagnets in said circuits adapted to attract the thermostatic element to ensure firm contacts while the circuits are made.

3. A thermostatic switch comprising a bimetallic strip, a contact point carried thereby, a contact point adapted to be engaged thereby, said bimetallic strip having a portion twisted about a longitudinal direction of the strip so that its transverse direction is inclined relative to the transverse directions of contiguous portions of the strip, whereby said strip is caused to move laterally slightly as it is deflected towards the latter contact point under the influence of changing temperature.

4. A thermostatic switch comprising a base, a tube projecting therefrom, a bimetallic strip mounted on the end of the tube remote from the base so that its free end projects into the base, an electromagnet mounted on the base, the winding being connected to the core and to an exterior circuit, and a contact point threadedly mounted on the core, said tube being bendable to provide coarse adjustment of the strip with respect to the contact point, fine adjustment being provided by adjustment of the contact point.

5. A thermostatic switch comprising a base adapted to be threadedly mounted on equipment whose change of temperature is to actuate the switch, a tube extending inwardly therefrom, a bimetallic strip having one end mounted in the end of the tube remote from the base, a magnetizable shoe carried by the free end of the bimetallic strip, a pair of electromagnets mounted on either side of the shoe and adapted to attract same when energized, a pair of leads connected to the windings of the magnets, contact points connected to said windings, and an arm movable between said contact points and adapted to be engaged by the bimetallic strip so as to close either circuit as the strip moves under the influence of changing temperature, the shoe being attracted by either electromagnet when energized to ensure a firm contact until the circuit is broken.

6. A thermostatic switch comprising a base adapted to be threadedly mounted on equipment whose change of temperature is to actuate the switch, a tube extending inwardly therefrom, a bimetallic strip having one end mounted in the end of the tube remote from the base, a magnetizable shoe carried by the free end of the bimetallic strip, a pair of electromagnets mounted on either side of the shoe and adapted to attract same when energized, a pair of leads connected to the windings of the magnets, contact points connected to said windings, and a resilient arm movable between said contact points tending to engage one of said points to close one circuit, said arm being adapted to be engaged by the bimetallic strip and to be moved thereby to engage the other point to close the other circuit, the electromagnet of the first said circuit being adapted to withdraw the bimetallic strip to permit firm contact between the arm and contact point until the circuit is interrupted and the electromagnet of the second said circuit being adapted to attract the bimetallic strip so as to press the arm firmly upon the second contact point until the circuit is interrupted.

7. A thermostatic switch comprising a base adapted to be threadedly mounted on equipment whose change of temperature is to actuate the switch, a tube extending inwardly therefrom, a bimetallic strip having one end mounted in the end of the tube remote from the base, a magnetizable shoe carried by the free end of the bimetallic strip, a pair of electromagnets mounted on either side of the shoe and adapted to attract same when energized, a pair of leads connected to the windings of the magnets, contact points connected to said windings, a resilient arm movable between said contact points tending to engage one of said points to close one circuit, said arm being adapted to be engaged by the bimetallic strip and to be moved thereby to engage the other point to close the other circuit, the electromagnet of the first said circuit being adapted to withdraw the bimetallic strip to permit firm contact between the arm and contact point until the circuit is interrupted, and the electromagnet of the second said circuit being adapted to attract the bimetallic strip so as to press the arm firmly upon the second contact point until the circuit is interrupted, and means for adjusting the arm and thereby adjusting the position of the free end of the bimetallic strip.

8. A thermostatic switch comprising a base adapted to be threadedly mounted on equipment whose change of temperature is to actuate the switch, a tube extending inwardly therefrom, a bimetallic strip having one end mounted in the end of the tube remote from the base and extending outwardly through the base, a magnetizable shoe carried by the free end of the bimetallic strip, a sheet of insulation mounted in said base, a pair of electromagnets mounted thereon on opposite sides of the bimetallic strip, the windings thereof being connected to the cores, a pair of leads connected to the windings of the magnets and forming part of a pair of grounded exterior circuits, members threaded in the cores of the magnets and contact points carried thereby, and contact points carried by the strip adapted to engage with the contact point of either electromagnet, thereby closing one of the circuits, energizing the electromagnet which is adapted to attract the shoe and maintain the points in contact until the circuit is interrupted exteriorly.

9. A thermostatic switch comprising a base adapted to be threadedly mounted on equipment whose change of temperature is to actuate the switch, a tube extending inwardly therefrom, a bimetallic strip having one end mounted in the end of the tube remote from the base, a magnetizable shoe carried by the free end of the bimetallic strip, a cover for the base, a pair of electromagnets mounted on the cover and adapted to be located on either side of the shoe and adapted to attract same when energized, a pair of leads connected to the windings of the magnets, contact points mounted on the cover and connected to said windings, and an arm mounted on the cover and adapted to be moved into engagement with said contact points, said arm being adapted to be engaged by the bimetallic strip so as to close either circuit as the strip moves under the influence of changing temperature, the shoe being attracted by either electromagnet when energized to ensure a firm contact until the circuit is broken.

10. A thermostatic switch comprising a base adapted to be threadedly mounted on equipment whose change of temperature is to actuate the switch, a tube extending inwardly therefrom, a bimetallic strip having one end mounted in the end of the tube remote from the base, a magnetizable shoe carried by the free end of the bimetallic strip, a cover for the base, a pair of electromagnets mounted on the cover and adapted to be located on either side of the shoe and adapted to attract same when energized, a pair of leads connected to the windings of the magnets, contact points mounted on the cover and connected to said windings, and a resilient arm mounted on the cover and movable between said contact points tending to engage one of said points to close one circuit, said arm being engaged by the bimetallic strip and adapted to be moved thereby to engage the other point to close the other circuit, the electromagnet of the first said circuit being adapted to withdraw the bimetallic strip to permit firm contact with the contact point until the circuit is interrupted, and the electromagnet of the second said circuit being adapted to attract the bimetallic strip to press the arm firmly upon the second contact point until the circuit is interrupted.

11. A thermostatic switch comprising a base adapted to be threadedly mounted on equipment whose change of temperature is to actuate the switch, a tube extending inwardly therefrom, a bimetallic strip having one end mounted in the end of the tube remote from the base, a magnetizable shoe carried by the free end of the bimetallic strip, a sheet of insulating material secured upon the base, a pair of electromagnets mounted thereon on either side of the shoe and adapted to attract same when energized, a pair of leads connected to the windings of the magnets, contact points connected to said windings, a resilient arm movable between said contact points tending to engage one of said points to close one circuit, said arm being adapted to be engaged by the bimetallic strip and to be moved thereby to engage the other point to close the other circuit, the electromagnet of the first said circuit being adapted to withdraw the bimetallic strip to permit firm contact between the arm and contact point until the circuit is interrupted, and the electromagnet of the second said circuit being adapted to attract the bimetallic strip so as to press the arm firmly upon the second contact point until the circuit is interrupted, a post on which said arm is mounted electrically connected to the base, and means for rotating said post to adjust the pressure of the arm upon the bimetallic strip.

EDGAR G. PETERSEN.